(12) United States Patent
Bittar et al.

(10) Patent No.: US 6,218,842 B1
(45) Date of Patent: Apr. 17, 2001

(54) MULTI-FREQUENCY ELECTROMAGNETIC WAVE RESISTIVITY TOOL WITH IMPROVED CALIBRATION MEASUREMENT

(75) Inventors: Michael Bittar; Roger Bartel, both of Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 09/368,471

(22) Filed: Aug. 4, 1999

(51) Int. Cl.[7] ............................. G01V 3/10; G01V 3/12; G01V 3/26
(52) U.S. Cl. ..................... 324/339; 324/335; 324/338
(58) Field of Search ...................... 324/335, 338, 324/339, 340, 341, 355, 356, 366, 367

(56) References Cited

U.S. PATENT DOCUMENTS

| | | | |
|---|---|---|---|
| 5,235,285 | 8/1993 | Clark et al. | 324/342 |
| 5,278,507 | 1/1994 | Bartel et al. | 324/338 |
| 5,318,137 | * 6/1994 | Johnson et al. | 175/40 |
| 5,318,138 | * 6/1994 | Dewey et al. | 175/74 |
| 5,332,048 | * 7/1994 | Underwood et al. | 175/26 |
| 5,594,343 | * 1/1997 | Clark et al. | 324/338 |

OTHER PUBLICATIONS

Bittar, M.S., Rodney, P.F., Hendricks, W.E., Invasion Profiling With a Multiple Depth of Investigation Electromagnetic Wave Resistivity Sensor, Society of Petroleum Engineers (SPE) 28425 (1994).

Bittar, M.S., Rodney, P.F., Mack, S.G., Bartel, R.P., A True Multiple Depth of Investigation Wave Resistivity Sensor: Theory, Experiment and Prototype Field Test Results, Society of Petroleum Engineers (SPE) 22705 (1991).

Ball, S., and Hendricks, W.E., Formation Evaluation Utilizing a New MWD Multiple Depth of Investigation Resistivity Sensor, Fifteenth European Formation Evaluation Symposium (May 5–7, 1993).

Sperry–Sun Drilling Services, MWD Tool Accurately Measures Four Resistivities, a reprint from Oil & Gas Journal, week of May 25, 1992.

* cited by examiner

Primary Examiner—Jay Patidar
(74) Attorney, Agent, or Firm—Conley, Rose & Tayon, P.C.

(57) ABSTRACT

A resistivity tool for use in an LWD system includes an asymmetric transmitter design with multiple transmitters capable of generating EM signals at multiple frequencies. A pair of receivers are positioned at one end of the transmitter array to detect the EM signals after they have traversed the region in the vicinity of the borehole. A calibrating transmitter is positioned between the receivers, which can be used in two different modes of operation. In a first mode, the calibrating transmitter is used to calibrate the receivers for thermal drift. In this calibration mode, an attenuation correction and phase shift correction can be calculated to correct for thermal drift of the receivers while the resistivity tool is in the borehole. Thus, the thermal drift of the receivers can be re-calibrated as often as desired while the tool is in the well. In a second mode of operation, the calibrating receiver may be used to measure the resistivity of the drilling mud in the borehole.

39 Claims, 9 Drawing Sheets

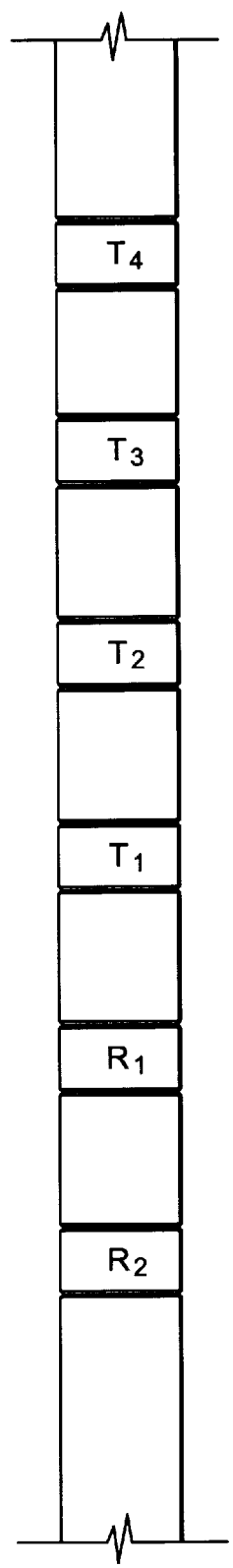
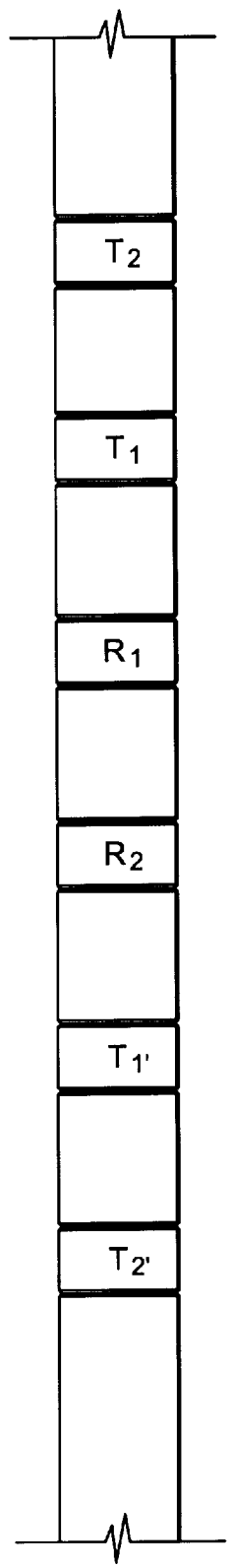
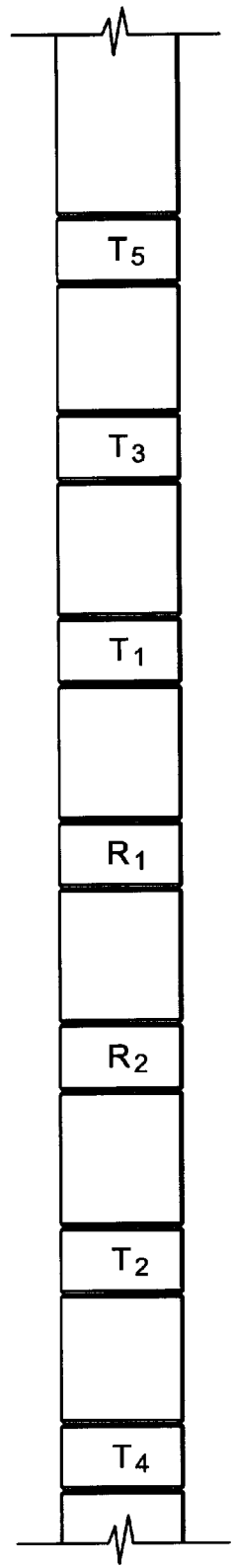
*Fig. 4*
(PRIOR ART)
*Fig. 5*
(PRIOR ART)
*Fig. 6*
(PRIOR ART)

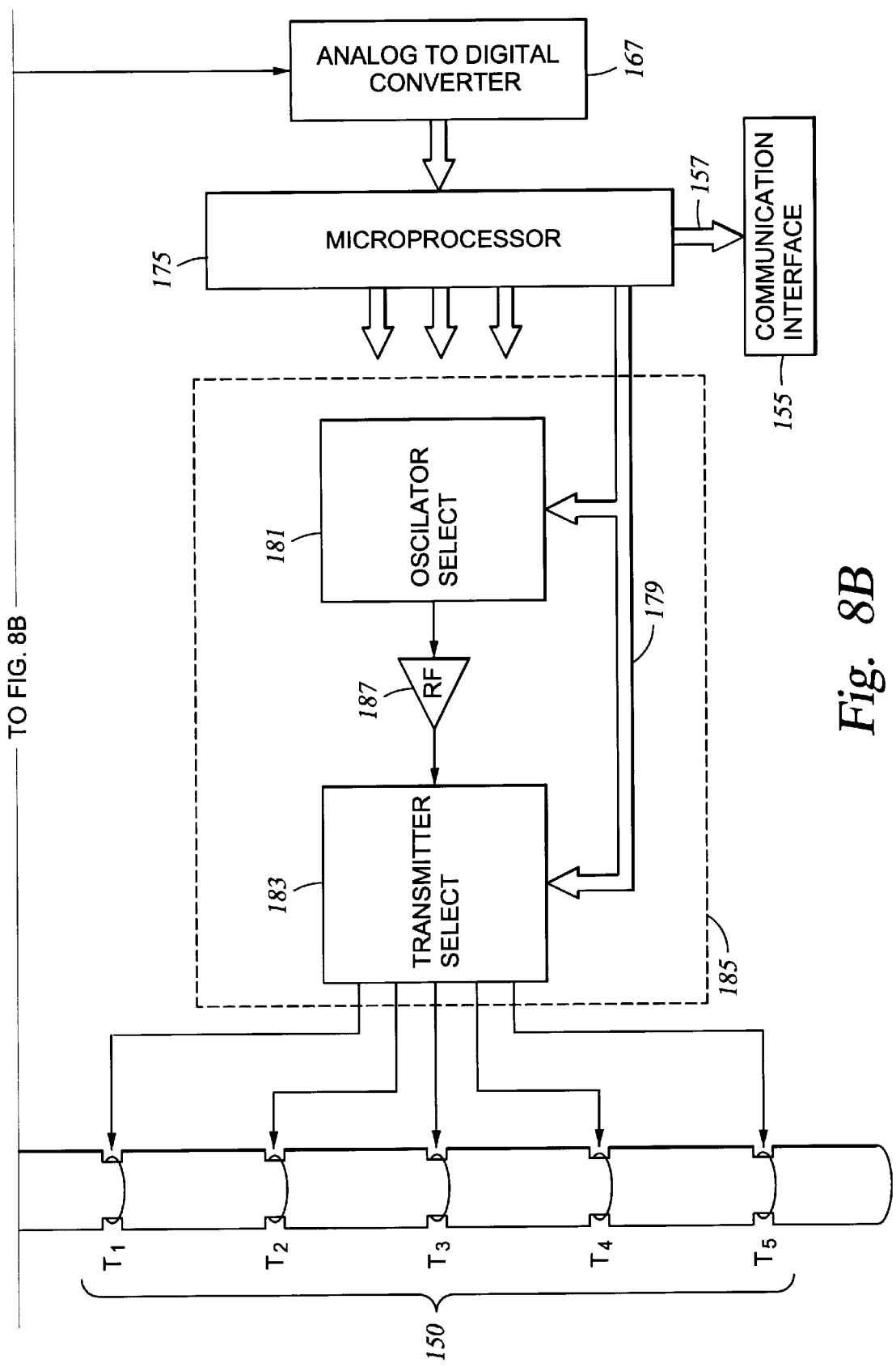

MULTI-FREQUENCY ELECTROMAGNETIC WAVE RESISTIVITY TOOL WITH IMPROVED CALIBRATION MEASUREMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention generally relates to a logging-while-drilling (LWD) tool that measures the resistivity of formations adjacent the wellbore. More particularly, the present invention relates to an LWD resistivity tool with multiple transmitters operating at multiple frequencies in an asymmetric configuration to provide multiple depths of investigation. Still more particularly, the present invention relates to an LWD resistivity tool that includes a calibrating transmitter that permits phase angle and attenuation corrections to be calculated for the resistivity measurements made during drilling operations.

2. Background of the Invention

Wells are drilled to reach and recover petroleum and other hydrocarbons in subterranean formations. Modern drilling operations demand a great quantity of information relating to the parameters and conditions encountered downhole to permit the driller to change the direction of drilling to find or stay in formations that include sufficient quantities of hydrocarbons. Such information typically includes characteristics of the earth formations traversed by the wellbore, in addition to data relating to the size and configuration of the borehole itself. The collection of information relating to conditions downhole, which commonly is referred to as "logging," can be performed by several methods.

Logging has been known in the industry for many years as a technique for providing information regarding the particular earth formation being drilled. In conventional oil well wireline logging, a probe or "sonde" is lowered into the borehole after some or all of the well has been drilled, and is used to determine certain characteristics of the formations traversed by the borehole. The sonde may include one or more sensors to measure parameters downhole and typically is constructed as a hermetically sealed steel cylinder for housing the sensors, which hangs at the end of a long cable or "wireline." The cable or wireline provides mechanical support to the sonde and also provides an electrical connection between the sensors and associated instrumentation within the sonde, and electrical equipment located at the surface of the well. Normally, the cable supplies operating power to the sonde and is used as an electrical conductor to transmit information signals from the sonde to the surface, and control signals from the surface to the sonde. In accordance with conventional techniques, various parameters of the earth's formations are measured and correlated with the position of the sonde in the borehole, as the sonde is pulled uphole.

While wireline logging is useful in assimilating information relating to formations downhole, it nonetheless has certain disadvantages. For example, before the wireline logging tool can be run in the wellbore, the drillstring and bottomhole assembly first must be removed or "tripped" from the borehole, resulting in considerable cost and loss of drilling time for the driller (who typically is paying daily fees for the rental of drilling equipment). In addition, because wireline tools are unable to collect data during the actual drilling operation, the drilling service company must at times make decisions (such as the direction to drill, etc.) possibly without sufficient information, or else incur the cost of tripping the drillstring to run a logging tool to gather more information relating to conditions downhole. In addition, because wireline logging occurs a relatively long period after the wellbore is drilled, the accuracy of the wireline measurement can be compromised. As one skilled in the art will understand, the wellbore conditions tend to degrade as drilling fluids invade the formation in the vicinity of the wellbore. Consequently, a resistivity tool run one or more days after a borehole section has been drilled may produce measurements that are influenced by the resistivity of the mud that has invaded the formation. In addition, the shape of the borehole may begin to degrade, reducing the accuracy of the measurements. Thus, generally, the sooner the formation conditions can be measured, the more accurate the reading is likely to be. Moreover, in certain wells, such as horizontal wells, wireline tools cannot run.

Because of these limitations associated with wireline logging, there is an increasing emphasis on developing tools that can collect data during the drilling process itself. By collecting and processing data and transmitting it to the surface real-time while drilling the well, the driller can more accurately analyze the surrounding formation, and also can make modifications or corrections, as necessary, to optimize drilling performance. With a steerable system the driller may change the direction in which the drill bit is headed. By detecting the adjacent bed boundaries, adjustments can be made to keep the drill bit in an oil bearing layer or region. Moreover, the measurement of formation parameters during drilling, and hopefully before invasion of the formation, increases the usefulness of the measured data. Further, making formation and borehole measurements during drilling can save the additional rig time which otherwise would be required to run a wireline logging tool.

Designs for measuring conditions downhole and the movement and the location of the drilling assembly, contemporaneously with the drilling of the well, have come to be known as "measurement-while-drilling" techniques, or "MWD." Similar techniques, concentrating more on the measurement of formation parameters of the type associated with wireline tools, commonly have been referred to as "logging while drilling" techniques, or "LWD." While distinctions between MWD and LWD may exist, the terms MWD and LWD often are used interchangeably. For the purposes of this disclosure, the term LWD will be used generically with the understanding that the term encompasses systems that collect formation parameter information either alone or in combination with the collection of information relating to the position of the drilling assembly.

Ordinarily, a well is drilled vertically for at least a portion of its final depth. The layers or strata that make up the earth's crust are generally substantially horizontal. Therefore, during vertical drilling, the well is substantially perpendicular to the geological formations through which it passes. In certain applications, however, such as when drilling from an off-shore platform, or when drilling through formations in which the reservoir boundaries extend horizontally, it is desirable to drill wells that are oriented more horizontally. When drilling horizontally, it is desirable to maintain the well bore in the pay zone (the formation which contains hydrocarbons) as much as possible so as to maximize the recovery. This can be difficult since formations may dip or divert. Thus, while attempting to drill and maintain the well bore within a particular formation, the drill bit may approach a bed boundary. Many in the industry have noted the desirability of an LWD system that could be especially used to detect bed boundaries and to provide real-time data to the driller to enable the driller to make directional corrections to stay in the pay zone. Alternatively, the LWD system could be used as part of a "Smart" system to automatically maintain the drill bit in the pay zone. See, e.g. commonly assigned U.S. Pat. No. 5,332,048, the teachings of which are incorporated by reference herein. The use of an LWD system with these other systems makes it possible to conduct at least certain portions of drilling automatically.

The measurement of formation properties during drilling of the well by LWD systems thus improves the timeliness of measurement data and, consequently, increases the efficiency of drilling operations. Typically, LWD measurements are used to provide information regarding the particular formation through which the borehole crosses. Currently, logging sensors or tools that commonly are used as part of either a wireline or an LWD system include resistivity tools. For a formation to contain hydrocarbons and permit the hydrocarbons to flow through it, the rock comprising the formation must have certain well known physical characteristics. One characteristic is that the formation has a certain measurable resistivity (the inverse of conductivity), which can be determined by an electromagnetic wave, of a particular frequency, that travels through the formation. As will be apparent to one skilled in the art, a wave traveling from point A to point B is attenuated and its phase is shifted proportionally to the conductivity of the media in which it travels. Analysis of this attenuation and phase shift provides the resistivity of the formation surrounding the resistivity tool, which then can be used in combination with other measurements to predict whether the formation will produce hydrocarbons. A sudden measured change in resistivity at the boundary between beds of shale and sandstone can be used to locate these boundaries. In horizontal drilling, the drill bit preferably can then be steered to avoid this boundary and keep the wellbore inside the oil-producing bed. However, to accomplish this detection reliably, a great deal of data is required from the resistivity tool.

Generally speaking, it is desirable for the resistivity tool to measure at multiple depths into the formation around the borehole between the transmitter and receiver pair. Referring to FIG. 1, the first and closest diameter of investigation relative to the resistivity tool is the area within the wellbore through which drilling mud flows back to the surface. If the resistivity of this area is measured inside the wellbore (around the tool itself), a resistivity value will be obtained that generally approximates the resistivity of the drilling mud, $R_m$. This diameter of investigation can be referred to as $D_m$, to denote that this is the depth of investigation that will produce a resistivity reading of the drilling mud. The next general area of investigation is the region within the surrounding formation that has been invaded by the drilling mud. This diameter of investigation can be referred to as $D_i$, because a resistivity measurement in this region will produce a resistivity value of approximately $R_{xo}$, which is the resistivity of the invaded zone. The third region of investigation for a resistivity tool, is the formation which has not been invaded by drilling mud. A resistivity measurement of this region will yield the true resistivity value of the formation, $R_t$. As one skilled in the art will understand, the diameters of investigation, $D_m$ and $D_i$ will vary depending upon many factors, including the position of the tool in the wellbore, the characteristics of the formation and the drilling mud, the time that has elapsed from when that portion of the wellbore was drilled, and the like. While information regarding $R_m$ and $R_{xo}$ are useful for purposes of evaluation, one of the goals of the resistivity tool is to measure the true formation resistivity, $R_t$. Thus, it is important to design the resistivity tool to have a sufficient depths of investigation to measure this resistivity.

Resistivity tools have undergone a substantial evolution in order to obtain more resistivity data. FIG. 2 shows a prior art resistivity tool that forms part of a bottomhole assembly. Above the bottomhole assembly, a drill string couples the bottomhole assembly to the structure at the surface of the well. The bottomhole assembly includes a drill bit that drills into the formation. A sensor sub is positioned at some location above the bit, and measures various information regarding the formation and the position of the bottomhole assembly. The sensor sub typically includes a resistivity tool capable of measuring the resistivity in the region around the borehole. The resistivity tool includes a transmitting loop antenna $T_x$ that transmits electromagnetic signals into the formation. The resistivity tool also includes a pair of loop antennas, $R_1$ and $R_2$, positioned a predetermined distance from the transmitter. Transmitter $T_x$ generates an electromagnetic (EM) wave at a selected frequency that is received at receivers $R_1$ and $R_2$ after traveling through the formation.

The placement of the transmitters with respect to the receiver, and the frequency selected for the EM wave depends on certain criteria. On the one hand, as the transmitter T is placed further away from the receiver pair $R_1$ and $R_2$, the attenuation of the transmitted wave becomes more severe. To compensate, the transmitter may use more power to generate a stronger signal that can be detected by the receiver pair. Because lower frequency signals attenuate more slowly than do high frequency signals, use of lower frequency signals can reduce the attenuation of the signal. Unfortunately, lower frequency signals provide less resolution regarding the formation bed boundaries than do high frequency signals. Yet another consideration is that lower frequency signals tend to propagate further into the formation, thus providing a potentially greater depth of investigation for the resistivity measurement. On the other hand, as the transmitter $T_x$ is placed closer to the receiver pair, $R_1$ and $R_2$, phase shift and attenuation become harder to detect. A higher frequency signal makes this detection easier. Thus, generally, lower frequency signals tend to be preferred as the distance between the transmitter and receiver pair increases, and higher frequency signals tend to be preferred as the distance decreases between the transmitter and the receiver pair.

The signals detected at the two receivers, $R_1$ and $R_2$, will of course differ because the distance between $R_2$ and transmitter $T_x$ is greater than the distance between $R_1$ and transmitter $T_x$. As one skilled in the art will understand, the ratio of the voltage received at $R_1$ and $R_2$ thus can be used to establish the attenuation ratio and phase shift difference of the transmitted EM wave that traveled through the formation of interest. This effectively produces a measurement at the point in the middle of the two receivers. The signal received at receiver $R_1$ can be expressed as $A_1 e^{j\phi_1}$, where $A_1$ represents the amplitude of the signal received at receiver $R_1$, and $\phi_1$ represents the phase. Similarly, the signal received at receiver $R_2$ can be expressed as $A_2 e^{j\phi_2}$, where $A_2$ represents the amplitude of the signal received at receiver $R_2$, and $\phi_2$ represents the phase. The ratio of the voltage, $R2/R1=A_2/A_1 e^{(j\phi_2-\phi_1)}$, where $A_2/A_1$ is the attenuation ratio and $(\phi_2-\phi_1)$ is the phase difference. Based upon the attenuation and phase shift measurements, an estimate of the resistivity can be made.

Improvements to this relatively simplistic design have been made over the years to produce more data regarding the formation, and to improve the quality of the data that is derived. For example, FIG. 3 shows a prior art resistivity tool with three transmitters $T_1$, $T_2$, and $T_3$, in addition to a pair of receivers, $R_1$ and $R_2$. The inclusion of two additional transmitters provides more resistivity data. In addition, because of the different spacing of the transmitters with respect to the receivers, the signals generated by each of the transmitters tends to traverse a different path to the receiver pair. The net effect of this spacing, therefore, is that the signal transmitted by the transmitter furthest from the receiver pair tends to travel more deeply into the formation. Thus, the different transmitters produce different depths of investigation of the formation. The transmitters are activated in a multiplexing fashion, so that each transmitter individually fires, thereby permitting the receivers to identify the source of the EM signal. Thus, during operation, a single transmitter fires, such as transmitter $T_1$, sending an EM wave at a particular frequency into the formation. The wave is then received at receivers $R_1$ and $R_2$, and an attenuation and phase shift measurement can be determined for that transmitter. Transmitter $T_2$ then fires at the same frequency, and an attenuation and phase shift is measured for that transmitter. Finally, transmitter $T_3$ fires, and an attenuation and phase shift measurement is made with respect to that transmitter. Each firing results in readings at the two receivers, $R_1$ and $R_2$. Multiple readings at the receivers result in multiple measurements of phase shift and attenuation of the signals. Consequently, a more accurate resistivity profile can be obtained, with multiple depths of investigation.

FIG. 4 shows a prior art resistivity tool with four transmitters $T_1$, $T_2$, $T_3$, and $T_4$, in addition to a pair of receivers, $R_1$ and $R_2$. See M. S. Bittar, et al., "A True Multiple Depth of Investigation Electromagnetic Wave Resistivity Sensor: Theory, Experiment and Prototype Field Test Results," presented at the 66$^{th}$ Annual Technical Conference and Exhibition of the Society of Petroleum Engineers on Oct. 6–9, 1991; S. Ball, et al., "Formation Evaluation Utilizing a New MWD Multiple Depth of Investigation Resistivity Sensor," presented at the Fifteenth European Formation Evaluation Symposium on May 5–7, 1993. As noted above, the greater the distance between a transmitter and a pair of receivers, the greater the depth of investigation into the formation. Thus, the addition of a fourth transmitter results in more data being received at the receivers, and a more accurate profile of resistivity around the well bore. As with the resistivity tool shown in FIG. 3, each transmitter fires sequentially, with attenuation and phase shift measurements being made based on the amplitude and time of the signals received by the receiver pair. Because transmitter $T_4$ is located further away from the pair of receivers, $R_1$ and $R_2$, it has been found advantageous to fire this transmitter at a lower frequency than the other transmitters $T_1$, $T_2$, $T_3$. A lower frequency signal from the transmitter transverses further (or deeper) into the formation than a comparable higher frequency signal, but results in lower vertical resolution. This lower resolution can be a problem, for example, when attempting to recognize the presence of a thin bed. Thus, it is advantageous in this design to utilize two different frequencies for the four transmitters (one frequency for $T_1$, $T_2$, $T_3$, and a lower frequency for $T_4$). Moreover, the smaller the distance between a transmitter and a pair of receivers, the less the depth of investigation into the formation. Thus, the addition of a fourth transmitter results in more data being received at the receivers, and a more accurate profile of resistivity around the well bore.

One of the problems with using the resistivity tool designs shown in FIGS. 2, 3 and 4 is that the measurements derived by the receivers will include some error components. Some of that error is attributable to the manner in which the receiver circuitry will react in response to the high temperatures encountered downhole. The high temperatures and other environmental obstacles encountered downhole can cause thermal drift of the electronics in the receivers. As one skilled in the art will appreciate, the high temperature affects the response of the circuitry (e.g. resistors, capacitors) in the resistivity tool. Simply put, this means that the two receivers may produce different responses because of the high temperatures in which they operate. Consequently, each resistivity tool must be corrected for thermal drift in some manner to ensure the accuracy of the resistivity measurements. Several correction techniques have developed to address this problem with thermal drift. One technique is to configure the resistivity tool in a compensated design that includes a transmitter array on each side of the receiver pair to produce compensated receiver values. A second technique is to use an asymmetrical transmitter design (as shown for example in FIGS. 2–4), with stored calibration values to correct the receiver measurements for thermal drift.

FIG. 5 shows a prior art resistivity tool with compensation. The resistivity tool in FIG. 5 includes a pair of receivers, $R_1$ and $R_2$, and four transmitters $T_1$, $T'_1$, $T_2$ and $T'_2$. Unlike the tool shown in FIG. 4, the compensated tool of FIG. 5 includes a symmetric pair of transmitters placed on both sides of the receivers, $R_1$ and $R_2$. The transmitters, $T_1$ and $T_2$, below the receivers are placed the same distance away from the receivers as the transmitters, $T_{1'}$ and $T_{2'}$, above the receivers, and thus have the same depth of investigation into the formation. The results from corresponding pairs of transmitters ($T_1/T_{1'}$ and $T_2/T_{2'}$) may be "averaged" to reduce the effects of electronic component response due to temperature variations. One problem with this arrangement, however, is that only two depths of investigation can be made because effectively only two transmitter spacings are provided. To increase the number of measurements and depths of investigation, each transmitter is fired at two different frequencies. For example, in addition to a 2 MegaHertz (MHz) frequency, the transmitters of this design may fire at 400 kHz. This permits four different depths of investigation into the surrounding formation. To provide additional depths of investigation, more transmitters must be added, extending the length of the tool.

FIG. 6 shows a resistivity tool that attempts to provide additional measurements with "pseudo-compensation." See U.S. Pat. No. 5,594,343. The resistivity tool of FIG. 6 includes a pair of receivers, $R_1$ and $R_2$, and a set of transmitters, $T_1$, $T_2$, $T_3$, $T_4$ and $T_5$. In this design, only two transmitters, $T_2$ and $T_4$, are placed below the receiver pair, whereas there are three transmitters, $T_1$, $T_3$ and $T_5$, above the receiver pair. The location of each transmitter below the receiver pair is determined by placing each transmitter half way between the position transmitters locations that would be used for a fully compensated resistivity tool. One advantage of this design is that more depths of investigation are possible than can be performed in a fully compensated tool. At the same time, this design also achieves some level of compensation, although temperature drift calibration is still required to some extent. However, those skilled in the art still debate whether the benefits in this design outweigh the error that is introduced by having an unbalanced configuration.

As compared to these compensated or pseudo-compensated designs shown in FIGS. 5 and 6, the second correction technique is to calibrate the asymmetrical resistivity tool designs shown in FIGS. 3 and 4 to correct for thermal drift. These designs have the advantage of providing more depths of investigation, since each transmitter provides a different depth of investigation. Thus, the four transmitter design of FIG. 4, for example, measures four depths of investigation. In systems, such as those shown in FIG. 4, the receivers are calibrated to determine the thermal drift of the receivers before the tool is used in an LWD operation. In this calibration process, the resistivity tool is heated to various temperatures, and the receiver response is evaluated. A look-up table is then constructed in memory to identify the thermal drift of the receivers at each temperature. When the tool subsequently is used in an LWD operation, the temperature in the vicinity of the receivers is measured, and the system determines a correction thermal drift value for the measured resistivity values by accessing the calibration look-up table. While this device may overcome the problem with thermal drift, it requires that the receivers be regularly calibrated before being used in the hole for thermal drift. This requires a lengthy calibration process, in which the tool is heated and thermal drift is measured for a range of temperatures. In addition, it is difficult to simulate the conditions encountered in a wellbore, and thus the calibration process may not adequately reflect the actual conditions encountered by the resistivity tool downhole.

It would be desirable if a resistivity tool could be developed that was capable of investigating a sufficient number of depths, while calculating correction values for thermal drift in a real-time or near real-time manner. Despite the apparent advantages that such a system would offer, to date no one has successfully introduced such a system.

BRIEF SUMMARY OF THE INVENTION

The problems noted above are solved in large part by a resistivity logging tool that includes a calibrating transmitter that can be used to measure the thermal drift of the receivers while the tool is in the wellbore during drilling operations. In accordance with the preferred embodiment, the calibrating transmitter is positioned at the midpoint between the receivers. During drilling operations, the calibrating transmitter periodically generates an electromagnetic (EM) wave that is detected by each receiver. The difference in attenuation and phase shift between the signals detected at the two receivers is used to calibrate the receivers for thermal drift. Consequently, the attenuation and phase shift measurements for each transmitter can be corrected for thermal drift based upon a calibration process that occurs while the tool is in the wellbore.

According to the preferred embodiment of the present invention, the transmitter array includes five transmitters spaced uniformly from a receiver pair. The transmitters that provide measurements at five different depths of investigation. To further supplement the information obtained regarding the formation, each of the transmitters in the transmitter array preferably are capable of operating at multiple frequencies. Thus, for example, each of the five transmitters in the array can generate EM waves (or signals) at both 2 MHz and at 500 kHz to increase the amount of information that can be obtained. This increased information makes it possible to obtain a deeper investigation depth, while insuring adequate vertical resolution. In addition, by comparing the measurements together, information can be learned regarding the dielectric constant of the formation, and other formation properties. According to the preferred embodiment, a calibrating transmitter is positioned between the receivers to perform two separate and independent functions. First, the calibrating transmitter can be used in a calibration mode to calibrate the receivers for thermal drift, while the tool is making resistivity measurements. The thermal drift corrections can then be used to compensate the attenuation and phase shift measurements obtained from the transmitter array. Second, the calibrating transmitter may be used in a measurement mode to measure the resistivity of the drilling mud, due to the close spacing of the calibrating transmitter to the receivers. In the measurement mode, the signal transmitted by the calibrating transmitter is used as a reference signal, and is compared with the phase of one of the receivers. In this manner, the absolute phase of the drilling mud can be determined to indicate the resistivity of the drilling mud.

These and other advantages of the present invention will become apparent on reading the detailed description of the invention in conjunction with the drawings.

BRIEF DESCRIPTION OF THE DRAWINGS

For a detailed description of the preferred embodiments of the invention, reference will now be made to the accompanying drawings in which:

FIG. 4 shows a prior art resistivity tool that includes four transmitters used in conjunction with a receiver pair;

FIG. 5 shows a prior art compensated resistivity tool that includes matching transmitter arrays;

FIG. 6 depicts a pseudo-compensated resistivity tool that includes unbalanced transmitter arrays on both sides of the receiver pair;

Notation and Nomenclature

During the course of the foregoing and following description, the terms "above" and "below" are used to denote the relative position of certain components with respect to the direction of flow of the incoming drilling mud. Thus, where a term is described as above another, it is intended to mean that drilling mud flows first through the first component before flowing through the second component. As will be apparent to one skilled in the art, these and other terms are used to identify the relative position of components in the bottomhole assembly (or BHA), with respect to the distance to the surface of the well, measured along the wellbore path.

Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

Figure 1:
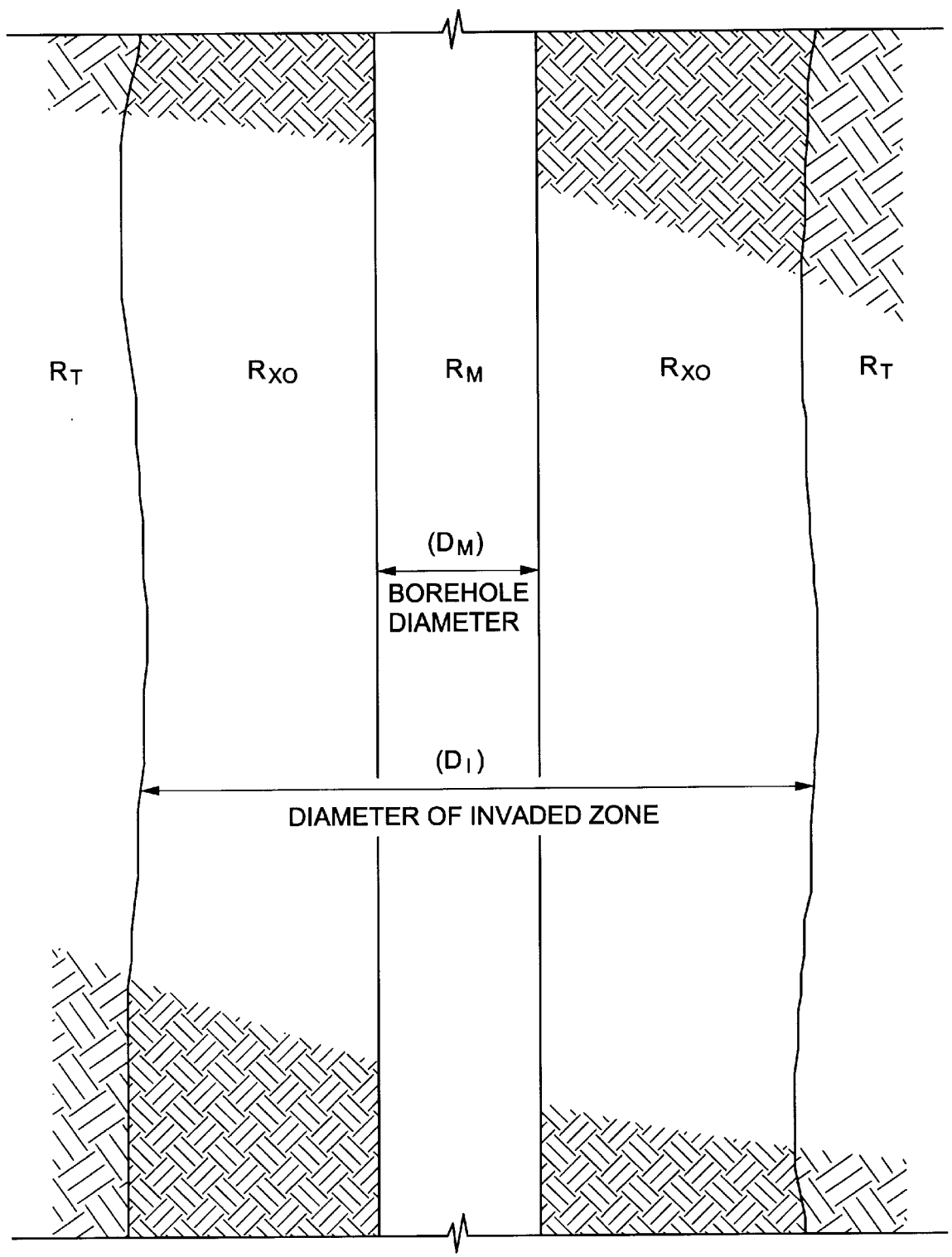
FIG. 1 illustrates the resistivity measurements obtained at different depths of investigation.
Figure 2:
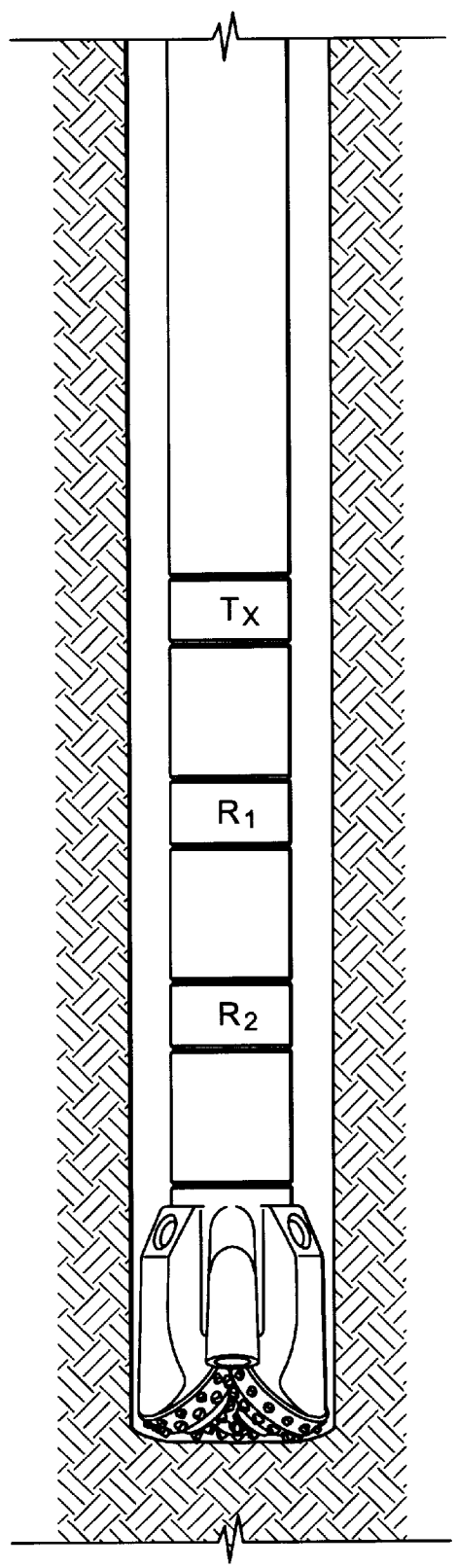
FIG. 2 shows a prior art resistivity tool with a single transmitter and a receiver pair.
Figure 3:
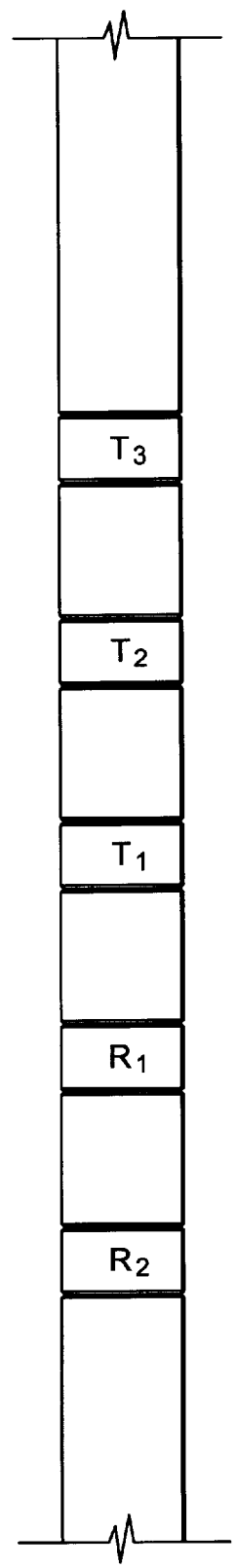
FIG. 3 shows a prior art resistivity tool that includes three transmitters used in conjunction with a receiver pair.
Figure 7:
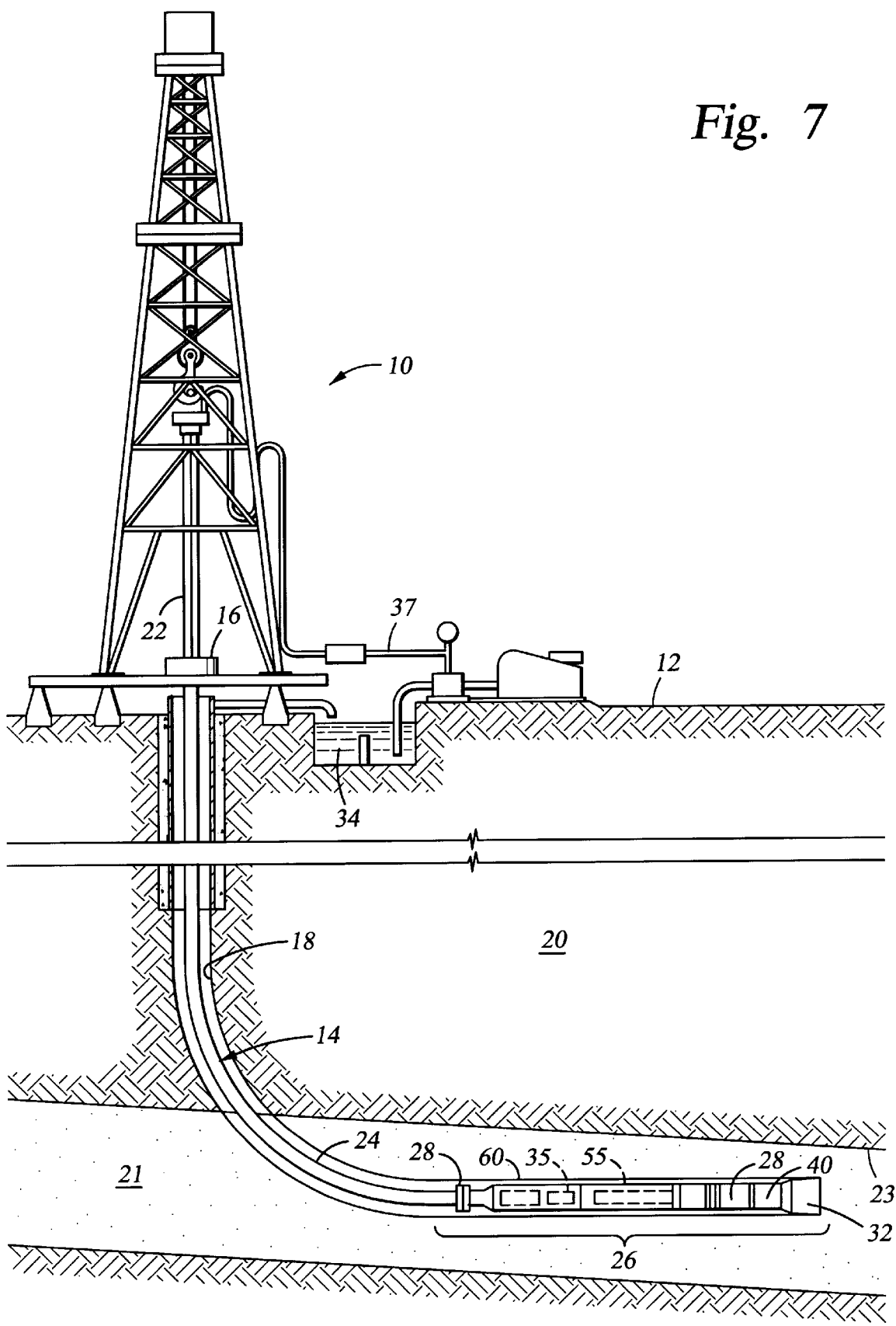
FIG. 7 is an illustration of a wellbore being drilled through subterranean formations in accordance with typical drilling practices.

Referring now to FIG. 7, a drilling installation includes a drilling rig 10 at the surface 12 of a well, supporting a drill string 14. The drill string 14 penetrates through a rotary table 16 and into a borehole 18 that is drilled through earth formations 20 and 21. The drill string 14 includes a kelly 22 at its upper end, drill pipe 24 coupled to the kelly 22, and a bottom hole assembly 26 (commonly referred to as a "BHA") coupled to the lower end of the drill pipe 24. Alternatively, the drill string may comprise a section of coiled tubing instead of, or in addition to, the drill pipe. The BHA 26 may include a drill bit 32, a downhole motor 40, one or more drill collars 28, a resistivity tool 100 mounted in collar section 55, directional sensors located in a non-magnetic section 60, and one or more stabilizer(s) (not shown) for penetrating through earth formations to create the borehole 18. In operation, the kelly 22, the drill pipe (or coiled tubing) 24 and the BHA 26 are rotated by the rotary table 16. The drill collars 28, which also may be non-magnetic so as not to interfere with the LWD measurements, are used in accordance with conventional techniques to add weight to the drill bit 32 and to stiffen the BHA 26, thereby enabling the BHA 26 to transmit weight to the drill bit 32 without buckling. The weight applied through the drill collars 28 to the bit 32 permits the drill bit to penetrate underground formations.

As the drill bit 32 operates, drilling fluid or mud is pumped from a mud pit 34 at the surface through the kelly hose 37, into the drill pipe (or coiled tubing) 24, to the drill bit 32. After flowing through the drill bit 32, the drilling mud rises back to the surface through the annular area between the drill pipe 24 and the borehole 18, where it is collected and returned to the mud pit 34 for filtering. The drilling mud is used to lubricate the drill bit 32 and to remove cuttings from the borehole 18. The drilling mud may also perform a number of other functions, which could include providing operating power to the downhole motor or other components downhole. As one skilled in the art will realize, the downhole motor or turbine 40 may be used downhole to rotate the drill bit 32 as an alternative, or in addition to, rotating the drill string from the surface. As shown in FIG. 7, BHA 26 typically is defined as all of the downhole components from the top of the drill collars 28, down to the drill bit 32, including downhole motor 40. As one skilled in the art will understand, downhole motor 40 is an optional component, which may be omitted from the BHA 26 if desired.

As is known in the art, the non-magnetic section 60 typically includes directional sensors and drilling parameter sensors such as weight-on-bit (WOB), torque-on-bit (TOB), shock, vibration, etc. In one embodiment, directional sensors are provided in the BHA 26 to provide an indication of inclination angle, the horizontal angle, and the rotational angle (a.k.a. "tool face angle") of the BHA 26. In accordance with known techniques, wellbore directional measurements can be made.

The LWD tool 55 preferably is located close to the drill bit 32 to facilitate the ability to examine the formation as close to the bit as possible. As one skilled in the art will understand, the LWD tool 55 could also be located further up the BHA 26 from the drill bit 32 without departing from the principles of the present invention. Moreover, the LWD tool 55 may in actuality comprise multiple collar sections if necessary to house other LWD sensors. The LWD formation sensors preferably include the resistivity tool 100, which is described in more detail in association with FIG. 8. Other LWD formation sensors also may be provided if desired, including for example gamma, sonic, density and neutron sensors. A battery pack, communication sub, or other power source may be included in the LWD tool 55, or alternatively may be positioned in any convenient location to provide power to the various electrical assemblies in the BHA.

Still referring to FIG. 7, a downhole data signaling unit 35 can also be provided as part of BHA 26 and may be used to transmit sensed values to a surface receiver via a mud pulse signal. The drilling mud can serve as a communication medium between the controller and components at the surface of the well. By altering the flow of the drilling mud through the interior of the drill string (or coiled tubing), pressure pulses may be generated in the column of drilling mud. By selectively varying the pressure pulses through the use of a mud pulser in the mud signaling unit 35, encoded binary pressure pulse signals can be generated to carry information indicative of downhole parameters to the surface for immediate analysis. In addition, the downhole system may also include the capability of receiving mud pulse signals from the surface to control the operation or activation of certain LWD sensors or other downhole components. Alternately, a composite drill string having embedded wires could be used to transmit data to the surface, or data could be saved downhole.

A downhole controller (not shown) may control the operation of signaling unit 35 and orchestrate the oepration of the LWD sensors and other BHA components. The controller may be located in sub 60 or elsewhere in the BHA 26. The controller also may make decisions based upon the processed data.

One or more stabilizers may be provided as part of the bottom-hole assembly. The stabilizer(s) could include adjustable blades in accordance with the disclosure in commonly assigned U.S. Pat. Nos. 5,318,137 and 5,318,138, the teachings of which are incorporated by reference as if fully set forth herein. As disclosed in these inventions, the inclination of the bottomhole assembly can be changed by selectively varying the extension of the stabilizer blades. As one skilled in the art will immediately recognize, the course of the BHA 26 also can be changed in accordance with other techniques, such as by selectively turning on or off a downhole motor, adjusting the angle of bend in a bent motor housing, or changing the weight on bit of the system. Use of such an adjustable component downhole in conjunction with an LWD system as disclosed herein makes it possible to design a "Smart System" for drilling certain portions of the wellbore automatically. Alternately, any other suitable system or assembly may be used for directional drilling without departing from the scope of the teachings herein. For example and as mentioned above, coiled tubing may be used in the drilling system, together with some sort of motor or crawler device. One skilled in the art will understand, therefore, that the LWD system disclosed herein may be used in any drilling system or drilling operation in which it is desirable to detect and locate formations and bed boundaries, regardless of the bottomhole assembly and drill string components that are used.

Figure 8A:
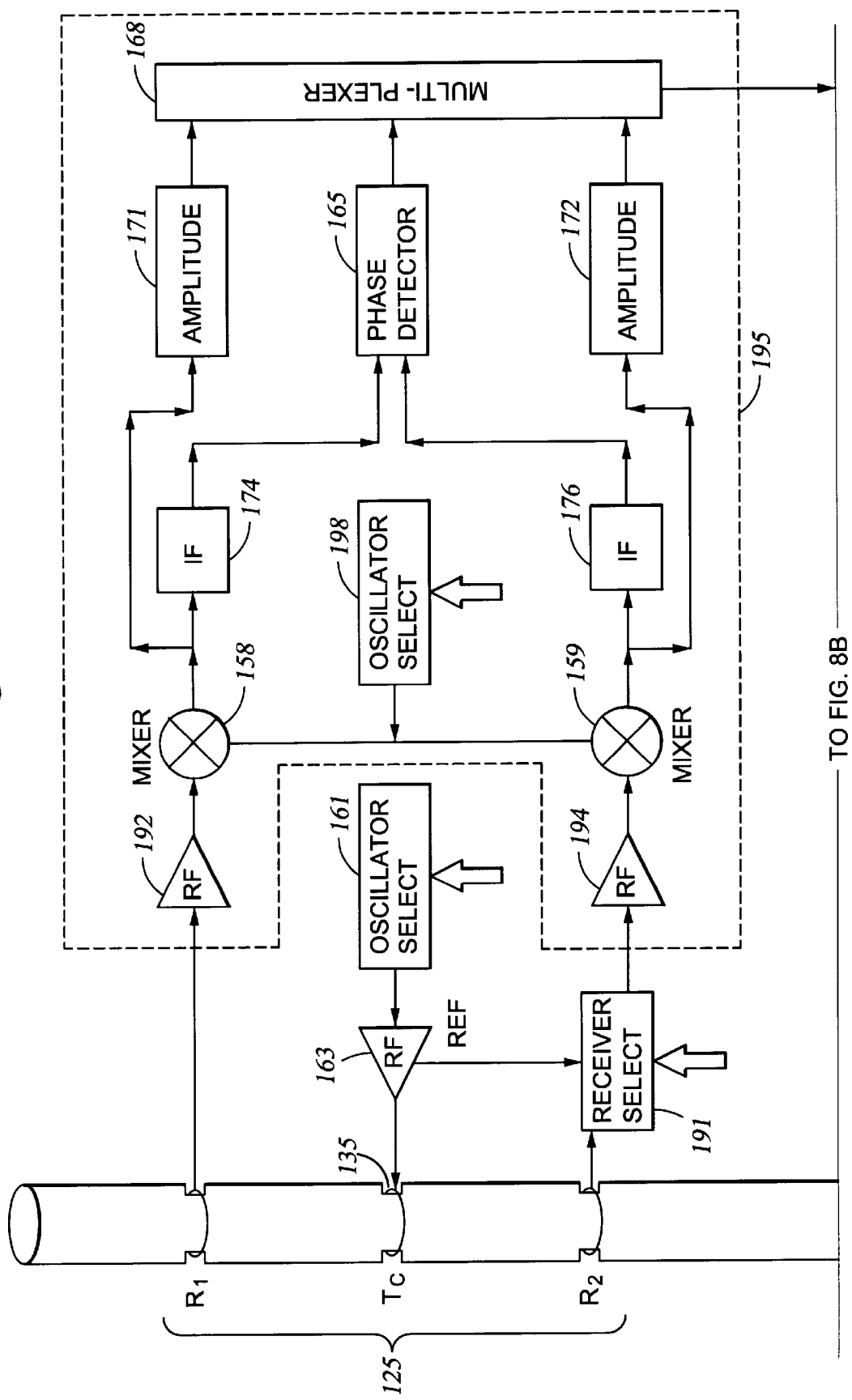
FIG. 8 is a schematic illustration of an LWD resistivity tool constructed in accordance with the preferred embodiment.

Referring now to FIG. 8, the resistivity tool 100 constructed in accordance with the preferred embodiment generally comprises a transmitter array 150, a receiver array 125, a calibrating transmitter 135, and associated electronics for controlling the transmission, reception and processing of electromagnetic (EM) signals by the transmitter and receiver arrays. In accordance with the preferred embodiment, the transmitter array 150 includes five transmitters, $T_1$, $T_2$, $T_3$, $T_4$, and $T_5$, spaced along the length of the resistivity tool 100. In accordance with normal convention, the receiver array 125 preferably includes a pair of receivers, $R_1$ and $R_2$, located adjacent the transmitter array 150. The calibrating transmitter 135 preferably comprises a single transmitter $T_c$, located at the midpoint between the receiver pair, $R_1$ and $R_2$.

As shown in FIG. 8, the transmitters, $T_1$, $T_2$, $T_3$, $T_4$, and $T_5$, are spaced at different distances from the receiver array 125, thus providing five different depths of investigation. In addition, each of the transmitters, $T_1$, $T_2$, $T_3$, $T_4$, and $T_5$, preferably are capable of operating at multiple frequencies, thus increasing the number of measurements that can be obtained by the resistivity tool 100. Thus, each transmitter, $T_1$, $T_2$, $T_3$, $T_4$, and $T_5$ in the transmitter array 150 preferably can generate EM signals (or waves) of at least two different frequencies to permit twenty different measurements to be obtained regarding the formation (2 frequencies×5 transmitters=10 measurements of phase; similarly, ten measurements of amplitude). This phenomenon is possible because EM signals at different frequencies tend to react differently. Generally, lower frequency signals tend to produce a greater depth of investigation, while sacrificing vertical resolution. The lower frequency signals also tend to be relatively immune to the dielectric effects of the formation. Higher frequency signals, conversely provide more vertical resolution, while producing a shallower depth of investigation. The higher frequency signals are more subject to dielectric properties of the formation. In the preferred embodiment, the transmitters, $T_1$, $T_2$, $T_3$, $T_4$, and $T_5$, are capable of producing EM signals at both 500 kHz and 2 MHz. One skilled in the art will understand that other signals of other frequencies may be used as a substitute for, or in addition to, signals of these frequencies. In the preferred configuration of the transmitter array 150, the transmitters are equally spaced apart. Thus, in the preferred construction of the resistivity tool 100, for example, the transmitter $T_1$, $T_2$, $T_3$, $T_4$, and $T_5$ are each located approximately 8 inches apart. Similarly, in the preferred embodiment, transmitter $T_1$ is located approximately 8 inches from receiver $R_2$. The transmitters and receiver antennas preferably are identically constructed and are mounted in slots in the resistivity tool 100.

The receivers, $R_1$ and $R_2$, are also preferably spaced approximately 8 inches apart. As shown in FIG. 8, the receivers $R_1$ and $R_2$ are positioned above the transmitter array 150 in the preferred embodiment. One skilled in the art will understand, however, that the receiver array 125 can be located below the transmitter array, if so desired. Referring still to FIG. 8, the calibrating transmitter 135, denoted as $T_c$, preferably is positioned between the two receivers, $R_1$ and $R_2$. Thus, in the preferred embodiment, the calibrating transmitter $T_c$ is positioned approximately 4 inches from both $R_1$ and $R_2$. According to the preferred embodiment, the calibrating transmitter $T_c$ performs two separate and independent functions. First, the calibrating transmitter $T_c$ generates EM signals that are used to calibrate the receivers, $R_1$ and $R_2$, for thermal drift, while the resistivity tool 100 is used downhole. Second, the calibrating transmitter $T_c$ also permits the resistivity of the drilling mud to be measured, due to the very shallow depth of investigation that results from the close spacing of the calibrating transmitter $T_c$ to the receiver pair, $R_1$ and $R_2$.

The resistivity tool 100 includes associated circuitry for controlling the transmission of EM pulses by the transmitter array 150 and the calibrating transmitter 135. The circuitry also processes the EM signals received by the receiver array 125 to obtain phase shift measurements and attenuation ratios for each transmitter (and each transmitter frequency). Thus, referring still to FIG. 8, the resistivity tool includes a microprocessor 175, transmitter logic 185, and receiver logic 195. In the preferred embodiment, the microprocessor 175 and receiver logic 195 are housed in a section above the receiver array 125, while the transmitter logic is housed in a section below the transmitter array 150. One skilled in the art will understand, however, that the microprocessor 175, transmitter logic 185, and receiver logic 195 may be positioned anywhere in the bottomhole assembly, or in another convenient location, as desired. In this preferred embodiment, a conductive cable 179 couples the microprocessor 175 to the transmitter logic 185. The cable may be either a serial cable, or may comprise a bus, with parallel lines capable of transmitting multiple digital signals simultaneously. The microprocessor 175 also couples to a communications interface 155, via a bus 157. The microprocessor 175 transmits the resistivity results obtained from the receiver circuitry to a downhole transmitter for relaying these results to the surface of the well. Thus, the communication interface 155 may couple to a downhole pulser, or to another communications device for transmitting the information to the surface of the well. Alternatively, the microprocessor 175 may store some or all of the resistivity results in memory downhole, for retrieval later.

The transmitter logic 185 preferably includes an oscillator select logic 181, an rf amplifier 187, and a transmitter select logic 183. The oscillator select logic 181 receives control signals from the microprocessor on cable 179. The oscillator select logic 181 preferably receives two or more different frequency input signals. In the preferred embodiment, the oscillator select logic 181 receives a separate 500 kHz signal and a 2 MHz signal from suitable sources. In addition, the oscillator select may include a grounded input signal, which can be selected during periods when no transmitter is to be fired. The oscillator select logic 181 preferably comprises a multiplexer, which selects one of the frequency input signals (or the grounded input signal) based upon the control signals received from microprocessor 175. The oscillator select logic 181 includes an output terminal on which the selected frequency signal is transmitted. The rf amplifier 187 preferably connects electrically to the output terminal of the oscillator select logic 181. The rf amplifier 187 amplifies the selected frequency signal from the oscillator select logic 181 to produce an amplified signal, in accordance with normal convention. The transmitter select logic 183 includes an input terminal that connects electrically to the output of the rf amplifier 187. The transmitter select logic 183 also includes one or more control input terminals that couple to the microprocessor 175 via cable 179. The output terminals of the transmitter select logic 183 electrically couple to each of the transmitters in the transmitter array 150. Thus, in the preferred embodiment, the transmitter select logic 183 couples to each of the transmitters, $T_1$, $T_2$, $T_3$, $T_4$, and $T_5$, along different transmission lines. The transmitter select logic 183 receives control signals from the microprocessor 175, which the transmitter select logic uses to select the particular transmitter that will receive the amplified frequency signal from the oscillator select logic 181 and rf amplifier 187. If desired, the transmitter select logic 183 also could include an output line that connects to ground, which would be selected if none of the transmitters are to fire. The microprocessor 175 thus controls the transmitter to be fired by control signals sent to the the transmitter select logic 183, and the frequency at which the transmitter will be fired, via control signals sent to oscillator select logic 181. The control signals may be encoded in either analog or digital form. In the preferred embodiment, an analog encoding scheme is employed in which the transmitter and frequency are selected based upon the voltage that is transmitted by the microprocessor 175 along cable 179. Thus, in the preferred embodiment, at least ten different voltage ranges are used to designate the transmitter and the frequency to be selected. Thus, for example, a voltage level of 1.0 volts–2.0 volts would indicate that the transmitters should fire at 500 kHz, while a voltage level of 2.0 volts to 3.0 volts indicates that the transmitters should fire at 2 MHz. Each transmitter then would be assigned a sub-range within each of these ranges. Thus, for example, transmitter $T_1$ is selected if the control signal from the microprocessor 175 is between 1.0–1.2 volts, or between 2.0–2.2 volts. As one skilled in the art will appreciate, many other encoding schemes could also be used to select the transmitter and the frequency of the transmitter.

Referring still to FIG. 8, the receiver logic 195 preferably includes a receiver select logic 191, a reference oscillator select logic 198, rf amplifiers 192, 194, phase detector circuitry 165, amplitude detectors 171, 172, and a multiplexer 168. As shown in FIG. 8, the receiver $R_1$ loop antenna couples to an rf amplifier 192, which in turn couples to mixer 158. The receiver $R_2$ loop antenna couples to the receiver logic 191, which selects either the signal received by receiver $R_2$, or a reference waveform from the calibrating transmitter $T_c$ circuitry. When used in a calibrating mode, the microprocessor 175 directs the receiver select logic 191 to select the signal received at receiver $R_1$. The output of the receiver select logic 191 connects to an rf amplifier 194, which in turn couples to mixer 159. Each of the mixers 158, 159 receive a signal from the reference oscillator select logic 198. The frequency of the signal from the reference oscillator select logic 198 is selected by a control signal from the microprocessor 175. Thus, in the preferred embodiment, the microprocessor selects either a 1.998 MHz or 498 kHz frequency signal to be applied to mixers 158 and 159, based on which frequency was used for the transmitted EM signal. Each of the mixers 158, 159 combine the signal from the rf amplifiers with the reference signal obtained from the oscillator select logic 198. This produces the sum and difference of the aforementioned signals, of which the difference frequency (the IF frequency) is of interest, nominally. The output of mixers 158, 159 connects to amplitude measurement circuitry, 171, 172 respectively, and to intermediate frequency (IF) circuitry 174, 176. The IF circuits 174, 176 preferably comprise amplifiers and bandpass filters. The bandpass filters are centered on 2 kHz to remove noise and other sidebands from the mixed signals.

As one skilled in the art will understand, the amplitude detector circuit 171 measures the amplitude of the received EM wave at receiver $R_1$, while amplitude detector circuit 172 measures the amplitude of the received EM wave at receiver $R_2$. The phase detector circuit 165, meanwhile, preferably measures the phase difference between the EM wave detected at receivers $R_1$ and $R_2$. The output values of the amplitude detector 171, amplitude detector 172, and phase detector 165 are provided in turn to the multiplexer 168. The multiplexer 168 directs which of the amplitude detectors 171, 172, or phase detector 165, will be transmitted to the A–D converter 167. As will be apparent to one skilled in the art, the multiplexer 168 selects the signal to pass based upon signals from the microprocessor. The input channel selected by the multiplexer 168 then is converted into a digital value by an analog-to-digital converter 167. The digital value of either the amplitude detector 171, amplitude detector 172, or phase detector 165, then is retrieved by the microprocessor 175. The microprocessor 175 then calculates the attenuation of the signals received by the receiver pair using formula (1) above. This attenuation and phase shift then may be further processed by the microprocessor to correct for drift in the receiver circuitry, in accordance with the preferred embodiment of the present invention.

In the preferred embodiment, circuitry also is provided for controlling the generation of EM signals by the calibrating transmitter, $T_c$. This circuitry preferably is housed with the receiver circuitry 195, although one skilled in the art will understand that the circuitry for the calibrating transmitter may be located with the circuitry for the other transmitters, or may be housed separately within the resistivity tool 100. Referring still to FIG. 8, the calibrating transmitter circuitry preferably includes an oscillator select circuit 161 and an rf amplifier 163. The oscillator select circuit 161 couples to one or more suitable clock sources for generating signals of one or more frequencies. The oscillator select circuit 161 alaso couples to the microprocessor 175 to receive a control signal that determines which of the signals will be provided to the calibrating transmitter, $T_c$. In the preferred embodiment, the oscillator select circuit 161 selects frequencies of 500 kHz and 2 MHz, although other frequencies could be used if desired. In addition, the oscillator select may also connect a grounded signal, which is selected if no transmission is desired. The output terminal of the oscillator select circuit 161 electrically connects to an rf amplifier 163, which amplifies the selected frequency signal to a suitable amplitude. The amplified frequency signal then is fed to the calibrating transmitter, $T_c$.

In the preferred embodiment, the resistivity tool 100 is periodically tested with an "air hang" test before being used in an LWD system. This test determines the baseline offset between the receivers when the receivers operate at room temperature. Thus, in the air hang test, each of the transmitters is fired, and the signals are then received by the receiver pair. The ratio of the amplitude of the received signals then is calculated by the microprocessor 175 to determine the attenuation offset of the receivers. If the receivers were perfectly calibrated, this test would produce an attenuation ratio of 1.00(amplitude=20 $\log_{10}$ (A)=20 $\log_{10}$ (1)=0 dB). Any deviation from 1.00 for this air hang test then is stored in memory associated with the microprocessor as the baseline drift of the receivers. Similarly, the phases of the received signals are compared during the air hang test, and a baseline offset for phase shift also is determined and stored in memory based upon the difference in phase between the detected waves.

As the resistivity tool 100 is used in the wellbore, the microprocessor 175 periodically generates a control signal to the oscillator select 161, causing the calibrating transmitter $T_c$ to fire an EM signal of a selected frequency. Based upon this EM signal, a phase shift is determined between the receivers, as well as an attenuation ratio. The phase shift and attenuation ratio obtained from the calibrating transmitter $T_c$ then are used as thermal drift values, and are applied to the air hang drift values to obtain a correction value for attenuation and phase shift for each of the frequencies used by the transmitters $T_1$, $T_2$, $T_3$, $T_4$ and $T_5$.

In accordance with normal convention, during measurement intervals, the transmitters $T_1$, $T_2$, $T_3$, $T_4$ and $T_5$ are alternatively fired, and the received signals are processed in the receiver circuitry and then transmitted to the microprocessor 175. Based upon the amplitude and phase shift detected by the receiver pair, the microprocessor calculates an attenuation and a phase shift for each transmitter for all of the frequency values while the tool is in the measurement interval. The amplitude for each transmitter frequency can be defined as follows:

Measured attenuation (dB)=formation attenuation (dB)–air hang offset (dB)–thermal drift (dB)

By removing the error caused by the air hang offset and the thermal drift, which is obtained from the calibrating transmitter, $T_c$, the microprocessor 175 can obtain a very accurate measurement of the attenuation caused by the formation for each transmitter, and each transmitter frequency.

Similarly, phase shift for each transmitter frequency can be defined as follows:

Measured phase shift (deg)=formation phase shift–air hang offset–thermal drift

By removing the error caused by the air hang offset and the thermal drift, which is obtained from the calibrating transmitter, $T_c$, the microprocessor 175 can obtain a very accurate measurement of the phase shift produced the formation for each transmitter, and each transmitter frequency. The formation attenuation and phase shift values then are used to determine the resistivity of the formation, using techniques well known in the art.

As noted above, the calibrating transmitter also may be used to obtain a measurement of the resistivity of the drilling mud, $R_m$. For calibration, the phase difference between $R_1$ and $R_2$ is measured and recorded as the thermal drift value. As a mud resistivity measuring instrument, the absolute phase is measured between $T_c$ and $R_1$. As shown in FIG. 8, this measurement is made by providing a reference waveform from the rf amplifier 163, which also is used to generate the EM signal at the calibrating transmitter $T_c$. When a mud resistivity measurement is desired, the microprocessor provides an appropriate control signal to the receiver select logic 191. The control signal from the microprocessor 175 causes the reference waveform from the oscillator select 161 and rf amplifier 163 to be selected by the receiver select logic 191. The reference waveform then passes to the phase detector circuit 165, together with the waveform received at receiver $R_1$. Thus, the phase detector 165 compares the waveform received at receiver $R_1$, with the reference waveform that was transmitted and routed through the receiver select circuit 191. Since the distance between $R_1$ and $T_c$ is very short (preferably about 4 inches), a very shallow depth of investigation is obtained that can be used in most cases as a measure of the mud resistivity.

Figure 9B:
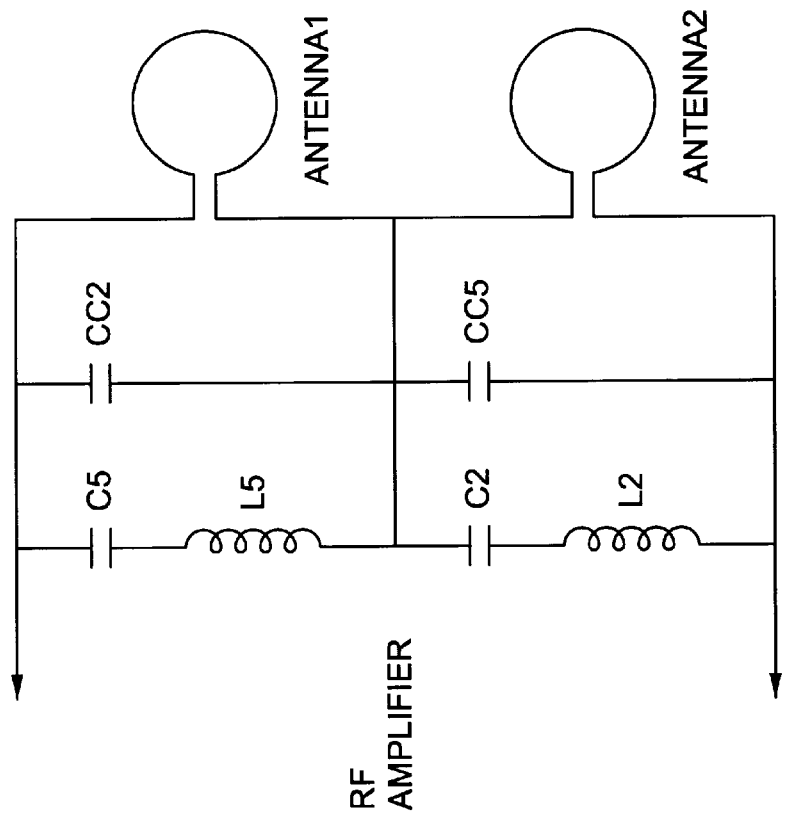
FIG. 9B is a circuit schematic of an alternative antenna arrangement for use in the resistivity tool of FIG. 8.
Figure 9A:
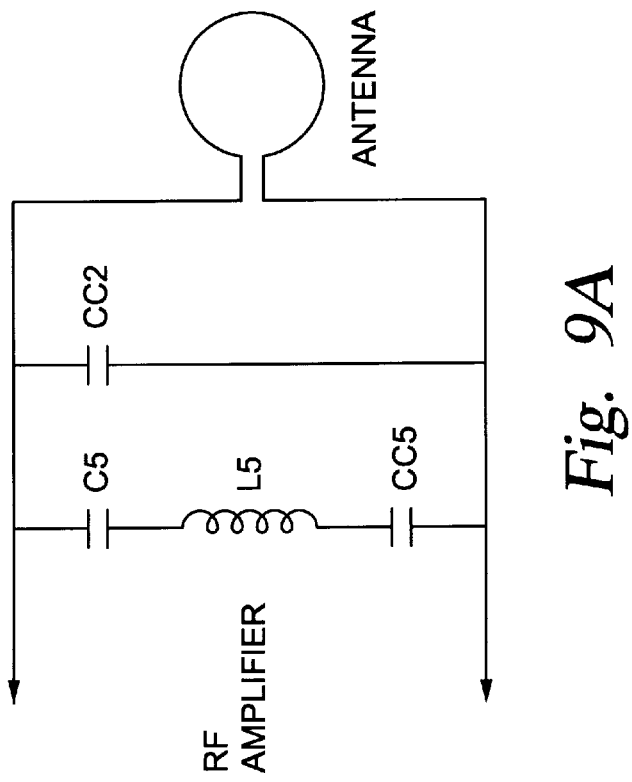
FIG. 9A is a circuit schematic of the antenna used in the resistivity tool of FIG. 8, in accordance with the preferred embodiment.
Figure 10A:
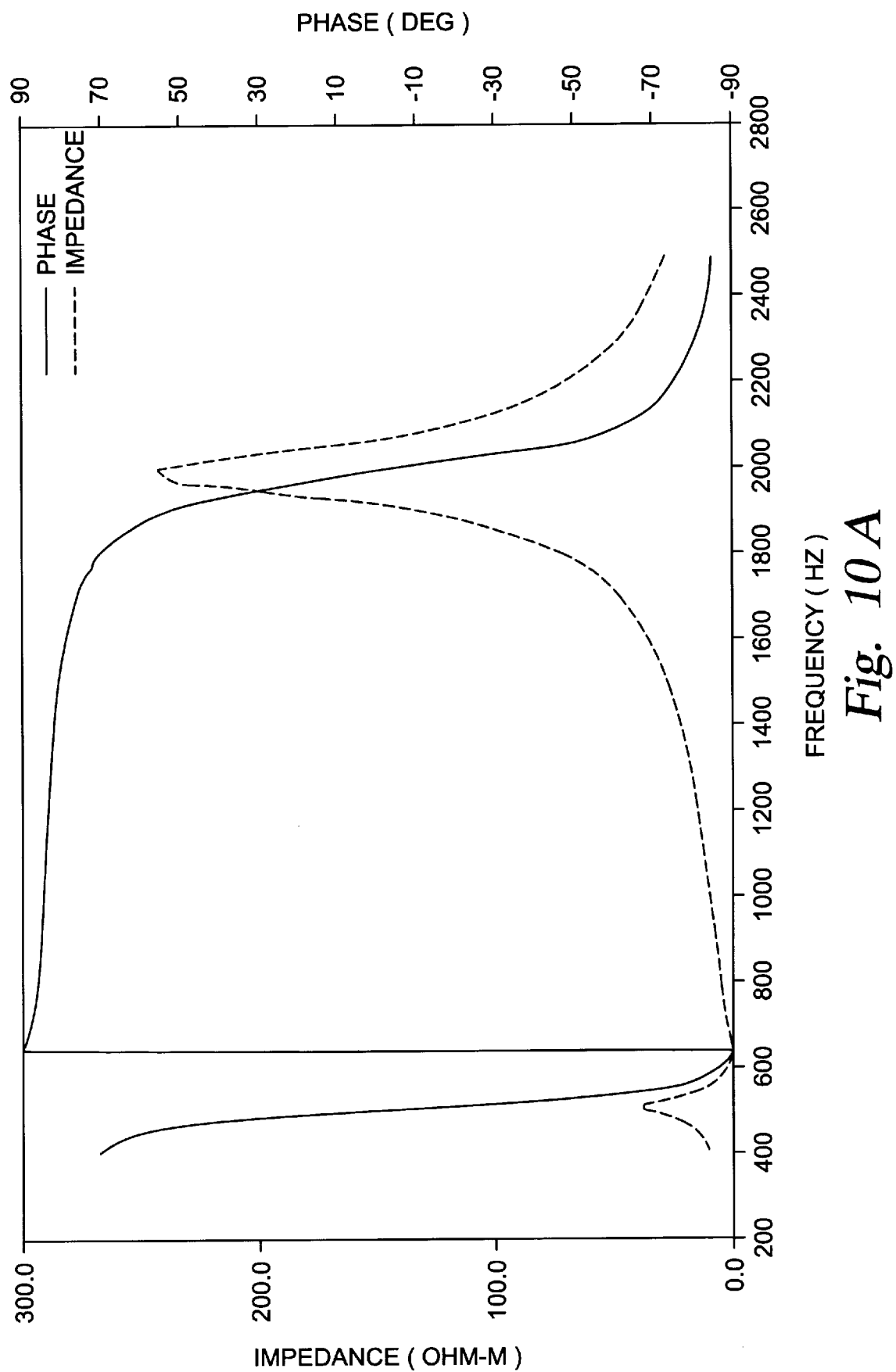
FIG. 10A is a graphical chart illustrating the impedance of the antenna of FIG. 9A as a function of frequency.

Referring now to FIGS. 9A and 9B, in the preferred embodiment the transmitters and receivers include an antenna capable of transmitting (or receiving) signals at the desired multiple frequencies. The antenna designs in FIGS. 9A and 9B are two alternative examples of antenna designs that may be used to produce dual frequencies. Referring first to FIG. 9A, a single antenna design can be used to resonate at two different frequencies, such as 500 kHz and 2 MHz. The circuit of FIG. 9A includes two matching circuits. The resonance of the first circuit is determined by the values of C5 and L5, while the resonance of the second circuit is determined by the values of C5, L5, CC5, and CC2. Thus, for example, C5 and L5 can be selected to resonate at 500 kHz. At resonance, the impedance of an LC circuit is zero, producing an electrical short circuit. Thus, at 500 kHz, the antenna is resonated by selection of CC2 and CC5, since C5 and L5 are shorted at 500 kHz. At 2 MHz, the antenna is resonated by selecting C5, L5, CC5 and CC2, as will be understood by one skilled in the art. FIG. 10A is a graph that depicts the impedance of the antenna of FIG. 9A for various frequencies.

Figure 10B:
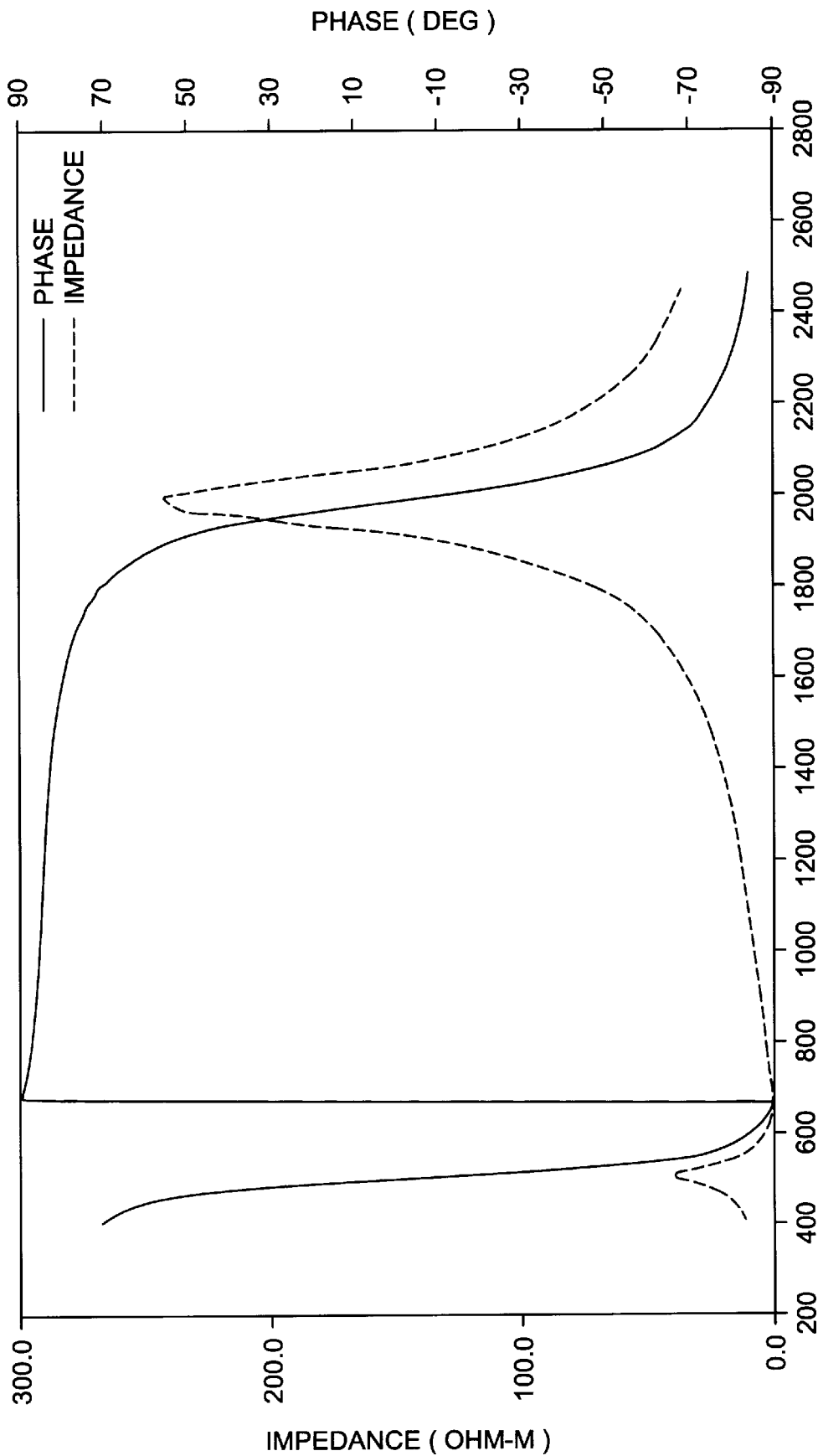
FIG. 10B is a graphical chart illustrating the impedance of the antenna of FIG. 9B as a function of frequency.

Referring now to FIG. 9B, the antenna design shown can be used with either a single antenna or a dual antenna. To resonate antennal at 2 MHz, the values of C2 and L2 are chosen to resonate at 2 MHz. That shorts antenna2 and L5, C5 and CC2 can then be selected to resonate antennal at 2 MHz. To resonate antenna 2 at 500 kHz, the values of C5 and L5 are chosen to resonate at 500 khz, thus shorting antennal. L2, C2 and CC5 then are selected to resonate antenna2 at 500 kHz. FIG. 10B is a graph that depicts the impedance of the antenna of FIG. 9B at various frequencies.

The above discussion is meant to be illustrative of the principles of the present invention. Numerous variations and modifications will become apparent to those skilled in the art once the above disclosure is fully appreciated. It is intended that the following claims be interpreted to embrace all such variations and modifications.

What is claimed is:

1. A resistivity logging tool, comprising:
a transmitter array that includes a plurality of transmitters that sequentially transmit electromagnetic signals into the formation;
a receiver array that includes two receivers that detect the transmitted electromagnetic signals and produce an indication of phase shift and attenuation for the signals received by the two receivers;
a calibrating transmitter positioned between said two receivers, said calibrating transmitter capable of producing an electromagnetic signal that is detected by said receiver array; and
a phase detector coupled to said receiver array, said phase detector measuring the difference in phase between said receivers attributable to thermal drift based upon the electromagnetic signal transmitted by said calibrating transmitter.

2. A resistivity logging tool as in claim 1, wherein said plurality of transmitters in said transmitter array are capable of generating electromagnetic signals at two different frequencies.

3. A resistivity logging tool as in claim 2, wherein said calibrating transmitter is capable of generating electromagnetic signals at said two different frequencies.

4. A resistivity logging tool as in claim 2, wherein said transmitter array includes five transmitters extending on one side of the receiver array.

5. A resistivity logging tool as in claim 1, wherein said calibrating transmitter is capable of generating electromagnetic signals to measure drilling and resistivity around the exterior of the logging tool.

6. A resistivity tool as in claim 5, further comprising a multiplexer that selects the frequency of the electromagnetic signal transmitted by said calibrating transmitter; and a microprocessor that couples to said multiplexer and which provides a control signal to said multiplexer to indicate the frequency to be selected.

7. A resistivity tool as in claim 6, wherein said receiver array includes a first and a second receiver, and further comprising a receiver select logic that couples to said second retriever and to said multiplexer, and wherein said microprocessor couples to said receiver select logic to select either the signal detected by said second receiver, or a reference frequency signal from said multiplexer, based upon whether the calibrating transmitter is operating in a calibration mode or a mud resistivity measurement mode.

8. A resistivity tool as in claim 2, wherein said transmitter array includes a first multiplexer that selects the frequency of the electromagnetic signal.

9. A resistivity tool as in claim 8, wherein said transmitter array includes a second multiplexer that selects the transmitter which transmits the electromagnetic signal.

10. A resistivity tool as in claim 9, further comprising a microprocessor coupled to said first and second multiplexers, said microprocessor generating a control signal to said first and second multiplexer to indicate the frequency of the electromagnetic signal, and the transmitter to be selected.

11. A resistivity tool as in claim 1, wherein the receiver array includes a first receiver and a second receiver spaced approximately 8 inches apart, and said calibrating transmitter is positioned approximately four inches from said first receiver and said second receiver.

12. A resistivity tool as in claim 11, wherein said transmitters in said transmitter array are spaced an equal distance apart.

13. A resistivity tool as in claim 1, wherein said transmitters are spaced approximately 8 inches apart, and said receivers are spaced approximately 8 inches apart.

14. A resistivity tool as in claim 1, wherein each of said transmitters and receivers include a loop antenna and associated circuitry capable of resonating at two different frequencies.

15. A logging tool as in claim 1, further comprising an amplitude detector coupled to said receiver array that generates an output signal indicative of the amplitude of the signal received at each of said two receivers.

16. A logging tool as in claim 15, further comprising a microprocessor coupled to said amplitude detector, and wherein said microprocessor is programmed to determine attenuation between the signals received at said first and said second receiver attributable to thermal drift.

17. A logging tool as in claim 16, wherein said receiver array provides an attenuation measurement and a phase shift measurement for each transmitter, and said microprocessor corrects said attenuation measurement and said phase shift measurement based upon the attenuation and phase shift values attributable to thermal drift.

18. A logging-while-drilling tool that measures resistivity of a formation through which a borehole has been drilled, comprising:
   a transmitter array that includes a plurality of transmitters capable of transmitting electromagnetic signals into the formation;
   a receiver array that includes two receivers for measuring the electromagnetic signalas after they have traversed the formation;
   a calibrating transmitter positioned between said two receivers, said transmitter being capable of operating in a first mode to calibrate the two receivers for thermal drift, or of operating in a second mode to measure drilling mud resistivity in the borehole;
   a frequency generator coupled to said calibrating transmitter, said frequency generator producing a signal that said calibrating transmitter transmits;
   receiver select logic coupled to one of said two receivers and to said frequency generator, said receiver select logic being capable of selecting a signal either from said receiver or from said frequency generator based upon a control input signal; and
   a microprocessor coupled to said receiver select logic, said microprocessor generating said control signal to select the signal from said receiver when said calibrating transmitter is to operate in a calibrating mode, and said microprocessor selecting the signal from said frequency generator when said calibrating transmitter is to operate in a measurement mode.

19. A logging-while-drilling tool as in claim 18, wherein at least one of said plurality of transmitters in said transmitter array is capable of generating electromagnetic signals at different frequencies, and said receivers are capable of detecting signals at said different frequencies.

20. A logging-while-drilling tool as in claim 19, wherein said calibrating transmitter also is capable of generating electromagnetic signals at said different frequencies.

21. A logging-while-drilling tool as in claim 20, wherein said different frequencies include approximately 500 kHz and 2 MHz, and said calibrating transmitter transmits at 2 MHz when operating in a measurement mode.

22. A logging-while-drilling tool as in claim 20, wherein transmitter array includes five transmitters extending on one side of the receiver array, and each of said transmitters is capable of transmitting electromagnetic signal at two different frequencies.

23. A logging-while-drilling tool as in claim 22, wherein said transmitter array includes a first multiplexer that selects the frequency of the electromagnetic signal; a second multiplexer that selects the transmitter which transmits the electromagnetic signal; and said microprocessor couples to said first and second multiplexers, said microprocessor generating a control signal to said first and second multiplexers to indicate the frequency of the electromagnetic signal, and the transmitter to be selected.

24. A logging-while-drilling tool as in claim 23, wherein the two receivers are spaced approximately 8 inches apart, and said calibrating transmitter is positioned approximately in the middle of the two receivers.

25. A resistivity tool as in claim 24, wherein said transmitters in said transmitter array are spaced an equal distance apart.

26. A logging-while-drilling tool that measures resistivity of a formation through which a borehole has been drilled, comprising:
   a transmitter array that includes a plurality of transmitters capable of transmitting electromagnetic signals of at least two different frequencies into the formation;
   a receiver array that includes at least two receivers for measuring the electromagnetic signals after they have traversed the formation; and
   a calibrating transmitter positioned between said two receivers, said calibrating transmitter being capable of transmitting an electromagnetic signal of at least two different frequencies for calibrating the receiver array to correct for thermal drift of the receivers at each of said two different frequencies.

27. A logging-while-drilling tool as in claim 26, further comprising:
   a frequency generator coupled to said calibrating transmitter, said frequency generator producing a signal at one of said different frequencies that said calibrating transmitter transmits;
   receiver select logic coupled to one of said two receivers and to said frequency generator, said receiver select logic being capable of selecting a signal either from said receiver or from said frequency generator based upon a control input signal;
   a microprocessor coupled to said receiver select logic, said microprocessor generating said control signal to select the signal from said receiver when said calibrating transmitter is to operate in a calibrating mode, and said microprocessor selecting the signal from said frequency generator when said calibrating transmitter is to operate in a measurement mode.

28. A resistivity logging tool, comprising:

a transmitter array that includes a plurality of transmitters that sequentially transmit electromagnetic signals into the formation;

a receiver array that includes two receivers that detect that transmitted electromagnetic signals and produce an indication of phase shift and attenuation for the signals received by the two receivers;

a calibrating transmitter positioned between said two receivers, said calibrating transmitter capable of producing an electromagnetic signal that is detected by said receiver array;

an amplitude detector coupled to said receiver array that generates an output signal indicative of the amplitude of the signal received at each of said two receivers and which determines attenuation between the signals received at said first and said second receiver attributable to thermal drift.

29. A resistivity logging tool as in claim 28, wherein said plurality of transmitters in said transmitter array are capable of generating electromagnetic signals at two different frequencies.

30. A resistivity logging tool as in claim 29, wherein said calibrating transmitter is capable of generating electromagnetic signals at said two different frequencies.

31. A resistivity logging tool as in claim 29, wherein transmitter array includes five transmitters extending on one side of the receiver array.

32. A resistivity tool as in claim 29, further comprising a microprocessor coupled to said amplitude detector that determines the attenuation between the received signals, and wherein said transmitter array includes a first multiplexer that selects the frequency of the electromagnetic signal and a second multiplexer that selects the transmitter which transmits the electromagnetic signal, and said microprocessor generates a control signal to said first and second multiplexer to indicate the frequency of the electromagnetic signal, and the transmitter to be selected.

33. A resistivity tool as in claim 32, further comprising a phase detector coupled to said receiver array, said phase detector measuring the difference in phase between said receivers attributable to thermal drift, and providing a signal indicative of the phase shift attributable to the thermal drift to said microprocessor.

34. A resistivity tool as in claim 33, wherein said receiver array provides an attenuation measurement and a phase shift measurement for each transmitter, and said microprocessor corrects said attenuation measurement and said phase shift measurement based upon the attenuation value and phase shift value attributable to thermal drift.

35. A resistivity tool as in claim 34, wherein the receiver array includes a first receiver and a second receiver spaced approximately 8 inches apart, and said calibrating transmitter is positioned approximately four inches from said first receiver and said second receiver.

36. A resistivity logging tool as in claim 35, wherein said calibrating transmitter is capable of generating electromagnetic signals to measure drilling mud resistivity around the exterior of the logging tool.

37. A resistivity tool as in claim 36, further comprising a multiplexer that selects the frequency of the electromagnetic signal transmitted by said calibrating transmitter; and said microprocessor couples to said multiplexer and provides a control signal to said multiplexer to indicate the frequency to be selected.

38. A resistivity tool as in claim 37, further comprising a receiver select logic that couples to said second receiver and to said multiplexer, and wherein said microprocessor couples to said receiver select logic to select either the signal detected by said second receiver, or a reference frequency signal from said multiplexer, based upon whether the calibrating transmitter is operating in a calibration mode or a mud resistivity measurement mode.

39. A resistivity tool as in claim 38, wherein each of said transmitters and receivers include a loop antenna and associated circuitry capable of resonating at two different frequencies.

* * * * *